United States Patent [19]
Toyoda

[11] Patent Number: 5,685,928
[45] Date of Patent: Nov. 11, 1997

[54] PNEUMATIC RADIAL TIRES WITH ZIGZAG BELT HAVING DIFFERENT CORD ANGLES

[75] Inventor: Kenji Toyoda, Tokyo, Japan

[73] Assignee: Bridgestone Corporation, Tokyo, Japan

[21] Appl. No.: 571,182

[22] Filed: Dec. 12, 1995

[30] Foreign Application Priority Data

Dec. 13, 1994 [JP] Japan .................................. 6-308842

[51] Int. Cl.⁶ .............................. B60C 9/18; B60C 9/28
[52] U.S. Cl. ..................... 152/533; 152/526; 152/538; 156/117; 156/177
[58] Field of Search ................................. 152/533, 526, 152/534, 535, 538; 156/117, 177

[56] References Cited

U.S. PATENT DOCUMENTS

| | | | |
|---|---|---|---|
| 2,947,339 | 8/1960 | Billingsley | 152/533 |
| 3,024,828 | 3/1962 | Smith et al. | 152/533 |
| 3,310,093 | 3/1967 | Frazier . | |
| 4,838,966 | 6/1989 | Oswald | 152/533 X |
| 5,465,773 | 11/1995 | Kadota et al. | 152/533 X |

FOREIGN PATENT DOCUMENTS

| | | | |
|---|---|---|---|
| 211149 | 6/1956 | Australia | 152/533 |
| 246620 | 12/1960 | Australia | 152/533 |
| 0 622 253 A1 | 11/1994 | European Pat. Off. . | |
| 1268334 | 6/1961 | France . | |
| 42 12 296 A1 | 10/1993 | Germany . | |
| 48-96259 | 11/1973 | Japan . | |
| 779159 | 7/1957 | United Kingdom . | |
| WO 88/03481 | 5/1988 | WIPO . | |

*Primary Examiner*—Adrienne C. Johnstone
*Attorney, Agent, or Firm*—Sughrue, Mion, Zinn, Macpeak & Seas, PLLC

[57] ABSTRACT

A pneumatic radial tire for use in heavy duty vehicles comprises a belt having a particular structure wherein a rubberized strip containing one or more cords is slantly extended from one of both side edges of the belt toward the other side edge with respect to an equatorial plane of the tire and continuously extended substantially zigzag in a circumferential direction of the tread while bending at each side edge of the belt at different inclination angles of the strip with respect to the equatorial plane in each of side regions of the belt before and after the bending at the side edge.

4 Claims, 21 Drawing Sheets

FIG._2

FIG_4

FIG_5

FIG_6

FIG_7

FIG_9

FIG_10

FIG_11

FIG_12

FIG_16

FIG_17

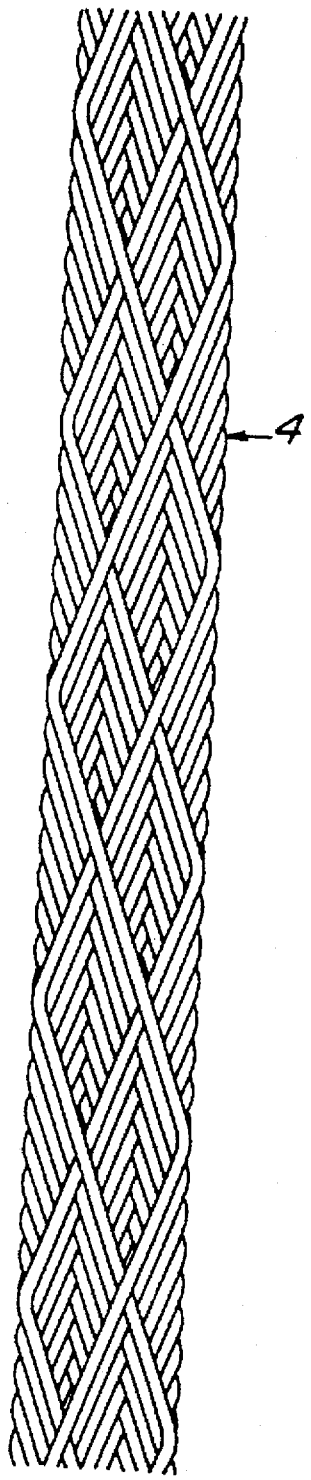
FIG_20a
COMPARATIVE
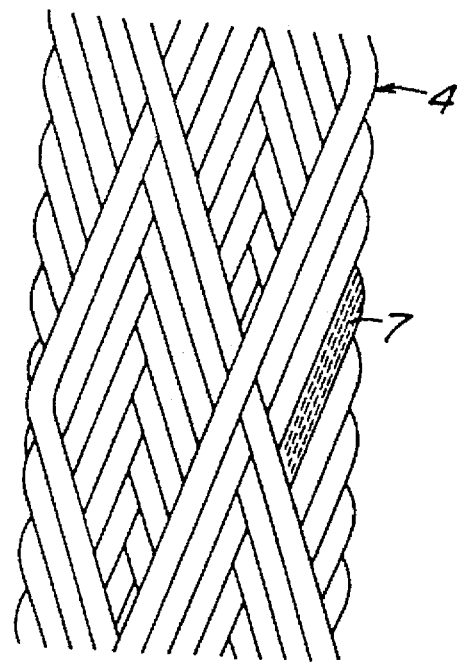
FIG_20b
COMPARATIVE

PNEUMATIC RADIAL TIRES WITH ZIGZAG BELT HAVING DIFFERENT CORD ANGLES

BACKGROUND OF THE INVENTION

1. Field of the Invention

This invention relates to pneumatic radial tires, and more particularly to a heavy duty pneumatic radial tire for truck and bus use under a high internal pressure capable of avoiding a separation failure at belt end by an arrangement of cords constituting the belt.

2. Description of the Related Art

This type of tire is disclosed in JP-U-48-96259 and the belt having a face without cut cords at each end thereof is attained by bending the cord which is inclined with respect to an equatorial plane of the tire (plane passing through a central circumference of the tread and perpendicular to a rotating axis of the tire) at a widthwise end region of the belt and extending zigzag in the circumferential direction of the tire. As a result, the occurrence of separation failure at belt end is avoided.

In such a belt, the cord is continuously extended in bent form at the belt end, so there is no cord deviation between upper and lower cord layers at the belt end. As a result, stretching at the belt end in the circumferential direction is very small when compared with the conventional belt obtained by laminating plural rubberized cord plies having a given width one upon the other to cross the cords of upper and lower plies to each other. This is particularly conspicuous in case of using high-strength cords such as steel cord and the like.

On the other hand, a distance from a rotating axis of the tire to an outer surface of the tire tread is smaller in a side end of the tread than in a central portion of the tread in the widthwise direction thereof. Particularly, a radial difference of the distance is large in heavy duty tires for truck and bus use. In this case, the shearing deformation in the circumferential direction is apt to be caused at the belt end existing in a ground contact region of the tire during running of the tire under loading. This shearing deformation produces a large slippage between the surface of the tread end and the road surface to bring about premature wear of the tread end as compared with the remaining portion of the tread or so-called shoulder wear. According to conventional techniques, therefore, the stretching at the belt end in the circumferential direction is ensured by laminating the belt plies to cross the cords of the upper and lower plies to each other. As a result, the radial difference between the central portion and the side end of the tread in the widthwise direction is absorbed.

In the belt having no cut cord face at the belt end as mentioned above, however, the stretching at the belt end in the circumferential direction is very small and can not be further stretched. Therefore it is difficult to absorb the radial difference between the central portion and the side end in the widthwise direction of the tread and the occurrence of shoulder wear can not be avoided. Such an occurrence of shoulder wear is a serious problem in tires avoiding the separation failure at belt end by using the belt having no cut cord face at the belt end.

Moreover, it is considered that the surface profile of the tread is rendered into a crown shape having a large radius of curvature to make the radial difference between the central portion and the side end in the tread small as a countermeasure for control of shoulder wear. In this case, the ground contact pressure rises at the tread end to increase the quantity of heat build-up and hence separation failure at belt end is inversely apt to be caused.

SUMMARY OF THE INVENTION

It is, therefore, an object of the invention to provide pneumatic radial tires capable of controlling the occurrence of shoulder wear while avoiding the occurrence of belt end separation.

According to the invention, there is the provision of a pneumatic radial tire comprising a radial carcass toroidally extending between a pair of bead cores, a belt and a tread disposed outward on the carcass in a radial direction of the tire; the belt being constituted with an arrangement of rubberized strip containing one or more cords slantly extended from one of both side edges of the belt toward the other side edge with respect to an equatorial plane of the tire and continuously extending substantially zigzag in a circumferential direction of the tread while bending at each side edge of the belt; and an inclination angle of the strip with respect to the equatorial plane in each of side regions of the belt differs before and after the bending at the side edge.

The term "side region of belt" as used herein means a region ranging from the side edge of the belt to 2 times of a width of the strip.

In preferable embodiments of the invention, the belt is at least two belt layers formed by laminating the strip to cross the cords of upper and lower portions to each other, and the inclination angle of the strip with respect to the equatorial plane is 5°–45°, and the bending angle of the strip at the side edge of the belt is 110°–150°.

BRIEF DESCRIPTION OF THE DRAWINGS

The invention will be described with reference to the accompanying drawings, wherein:

FIGS. 20a and 20b are a schematically developed view and a partial enlarged view of a belt as a comparative example.

DESCRIPTION OF THE PREFERRED EMBODIMENTS

Figure 1:
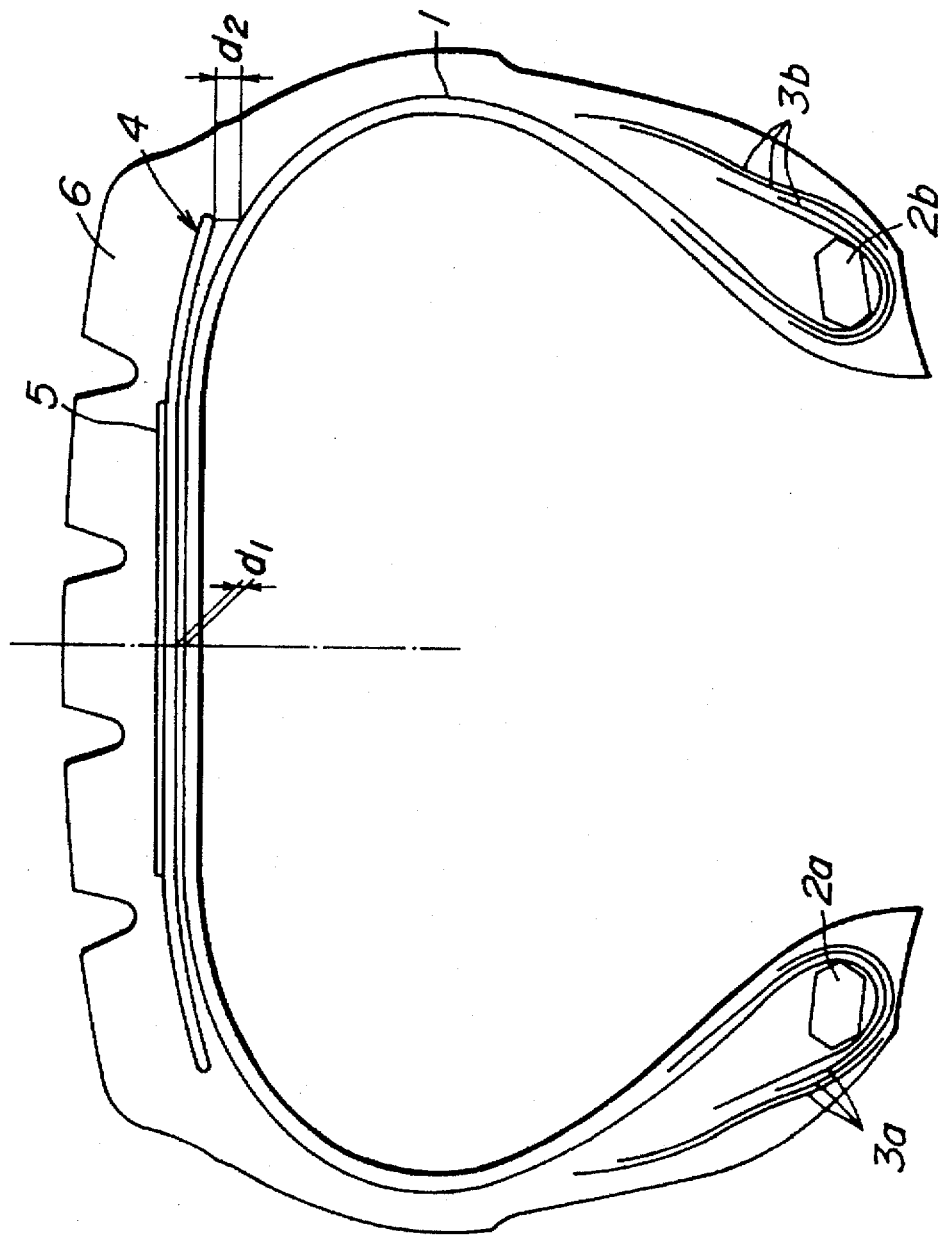
FIG. 1 is a diagrammatically radial section view of a first embodiment of the pneumatic radial tire according to the invention.
Figure 2:
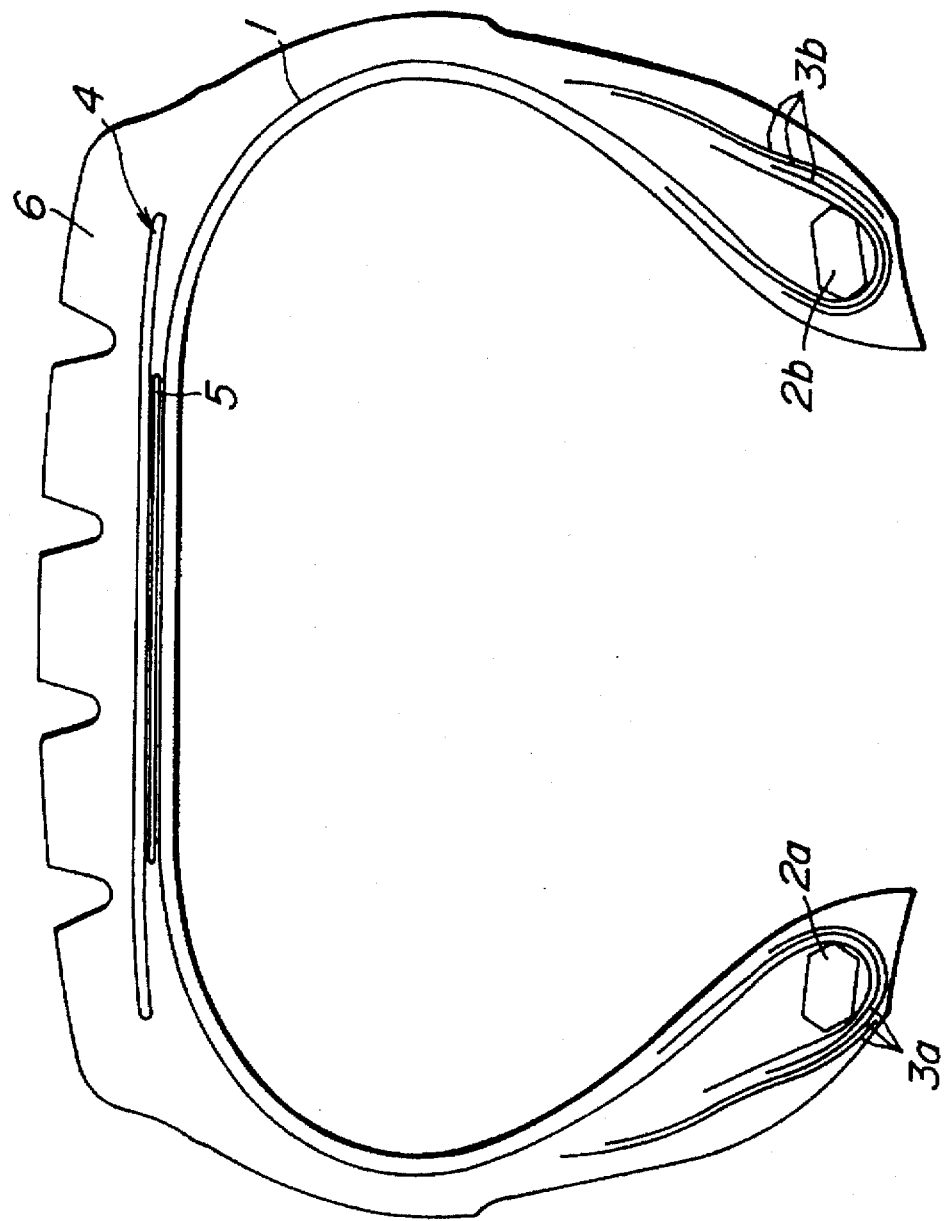
FIG. 2 is a diagrammatically radial section view of a second embodiment of the pneumatic radial tire according to the invention.
Figure 3:
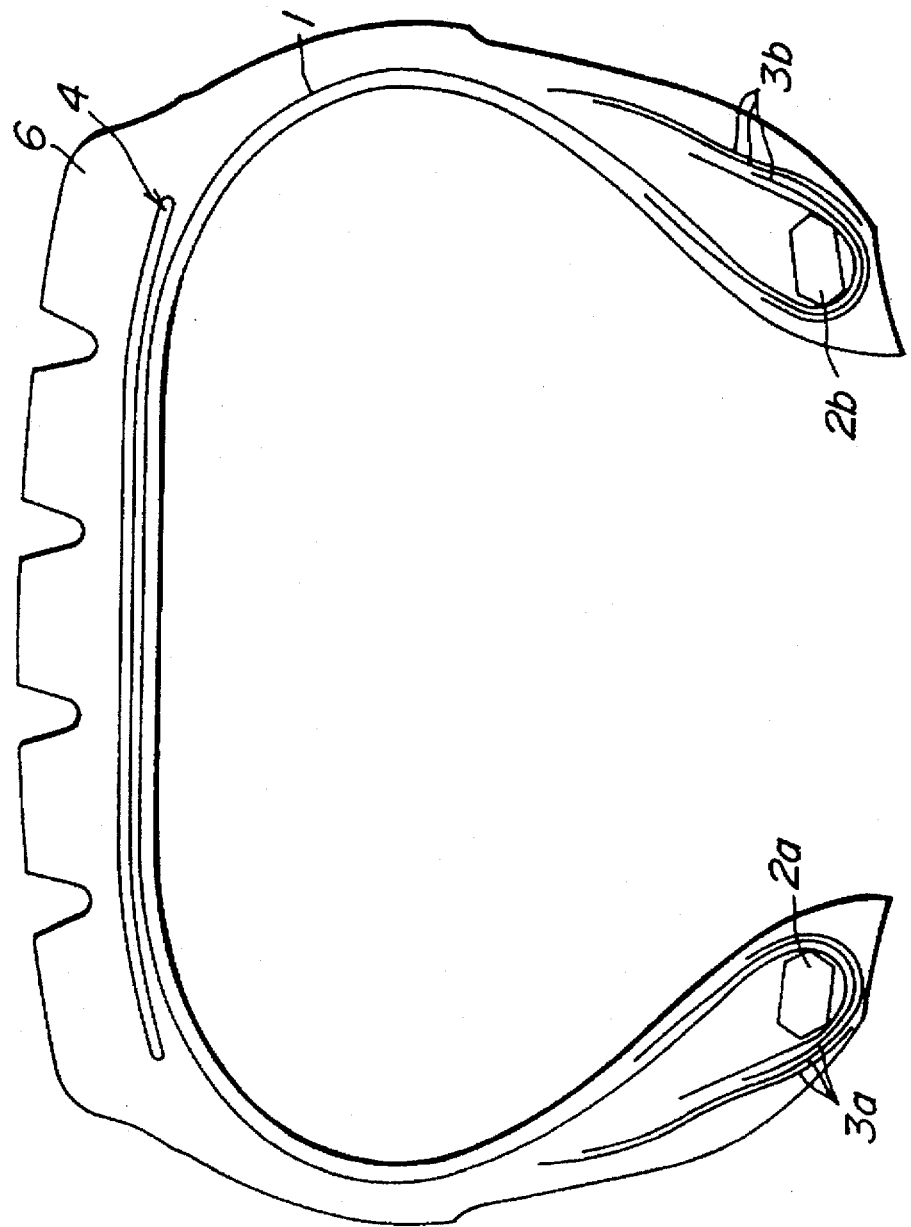
FIG. 3 is a diagrammatically radial section view of a third embodiment of the pneumatic radial tire according to the invention.

FIGS. 1–3 illustrate three embodiments of the pneumatic radial tire according to the invention.

Numeral 1 designates a carcass toroidally extending between a pair of bead cores 2a, 2b and comprised of one rubberized cord ply in the illustrated embodiments. Moreover, three bead portion reinforcing layers 3a, 3b are arranged around each of bead portions outside the carcass 1.

Further, a belt 4, a belt reinforcing layer 5 and a tread 6 are disposed outward on the carcass in the radial direction of the tire in that order. Moreover, the belt reinforcing layer 5 is disposed between the carcass 1 and the belt 4 in the tire of FIG. 2, while the belt reinforcing layer 5 is not used in the tire of FIG. 3.

As shown in FIGS. 4–11, the belt 4 is arranged with a rubberized strip 8 containing plural cords 7 (or one cord) slantly arranged with respect to an equatorial plane O of the tire and extending from one side edge of the belt toward the other side edge thereof in the widthwise direction, bent at the other side edge to extend from the other end toward the one side edge at an opposite inclination with respect to the equatorial plane O and then bent at the one side edge to again extend from the one side edge toward the other side edge. As a result, the strip continuously extends substantially zigzag in the circumferential direction of the tire. In the illustrated embodiments, the belt has a two-layer structure.

In accordance with this invention, it is important that when the strip 8 constituting the belt 4 is extended from one side edge of the belt toward the other side edge and bent at the other side edge, the inclination angle of the strip 8 with respect to the equatorial plane O in at least a side region of the belt differs before and after the bending at the side edge as shown in FIGS. 12–19 corresponding to FIGS. 4–11. That is, the inclination angle 61 of the strip 8 extending from one side edge toward the other side edge with respect to the equatorial plane O is different from the inclination angle 02 of the strip 8 extending from the other side edge toward the one side edge with respect to the equatorial plane O. Thus, the arrangement of piling the strip 8 one upon the other on both sides of the equatorial plane O in the belt is rendered into an unsymmetrical zone with respect to the equatorial plane in at least side regions of the belt. Consequently, the radial difference between the central portion and side end in the widthwise direction of the tread resulting in the shoulder wear is absorbed.

Figure 4:
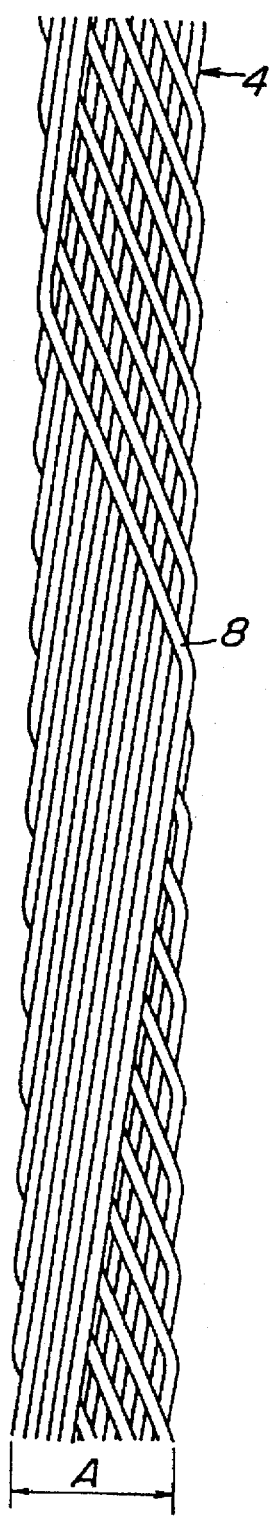
FIGS. 4 to 11 are schematically developed views of various embodiments of the belt according to the invention.
Figure 5:
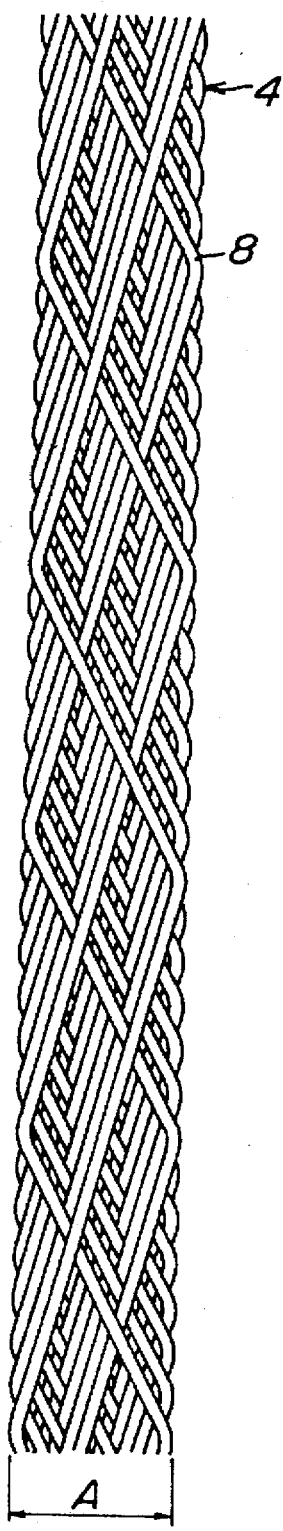
Figure 12:
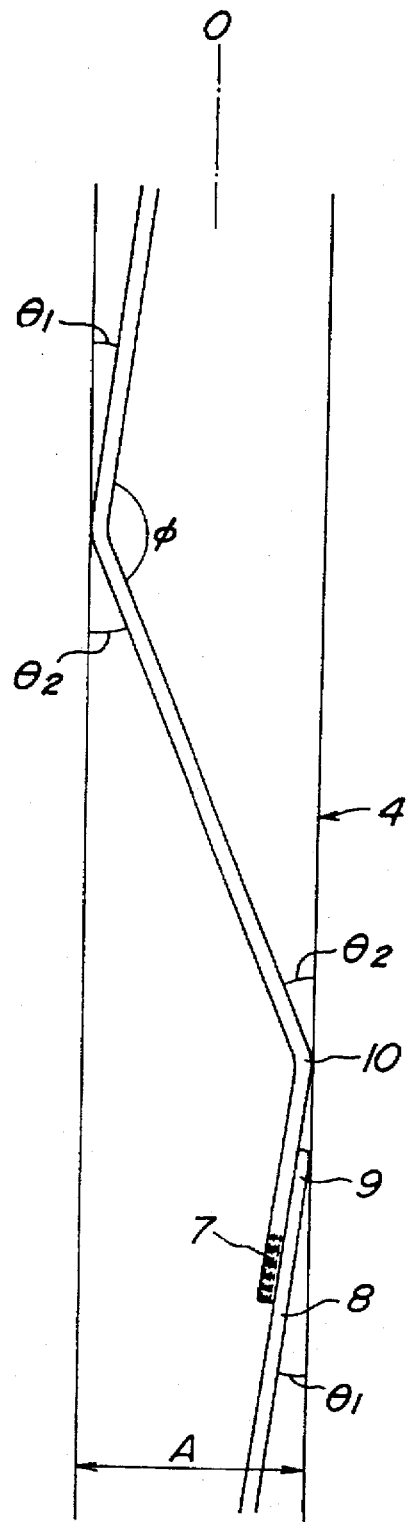
FIGS. 12 to 19 are schematic views illustrating an outline of forming the belt according to the invention, respectively.
Figure 13:
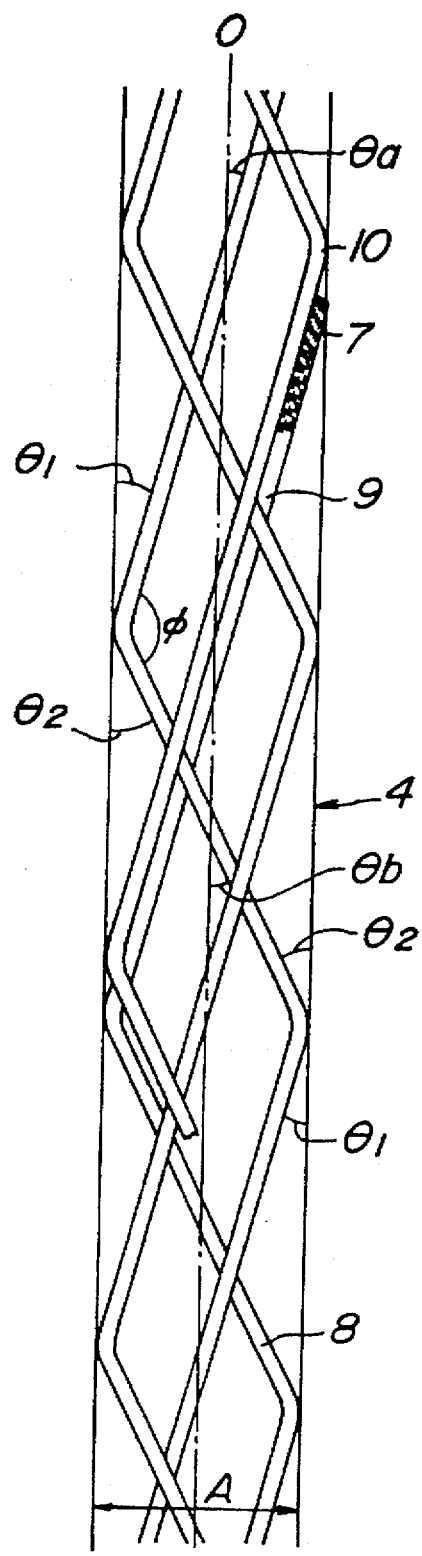

In the belts illustrated in FIGS. 4 and 5, the belt is rectilinearly extended toward one side edge at the inclination angle 01 and toward the other side edge at the inclination angle 32 during belt formation as shown in FIGS. 12 and 13. An unsymmetrical zone A with respect to the equatorial plane O in the arrangement pattern of the strip 8 is formed over a full width of the belt.

Figure 6:
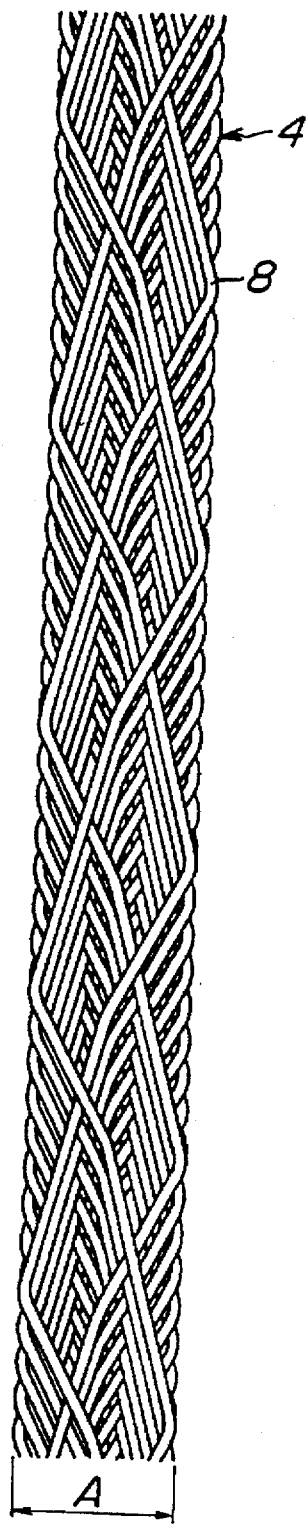
Figure 7:
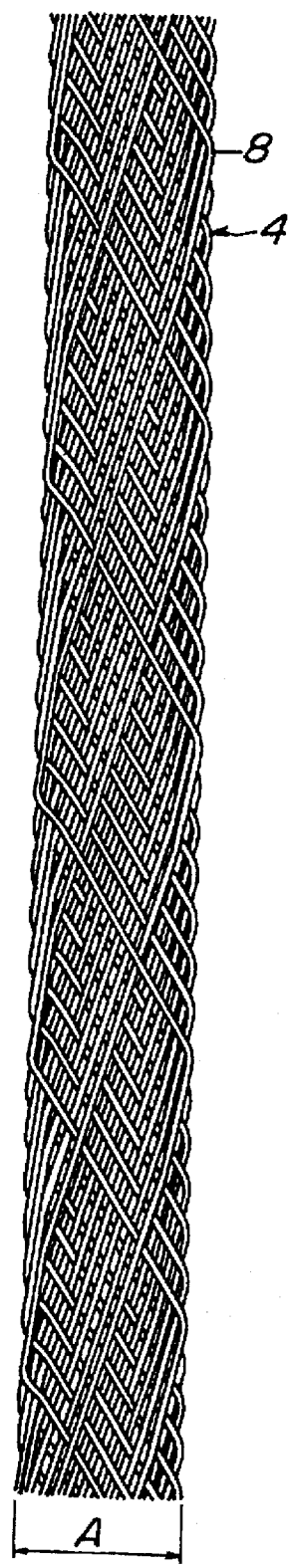
Figure 8:
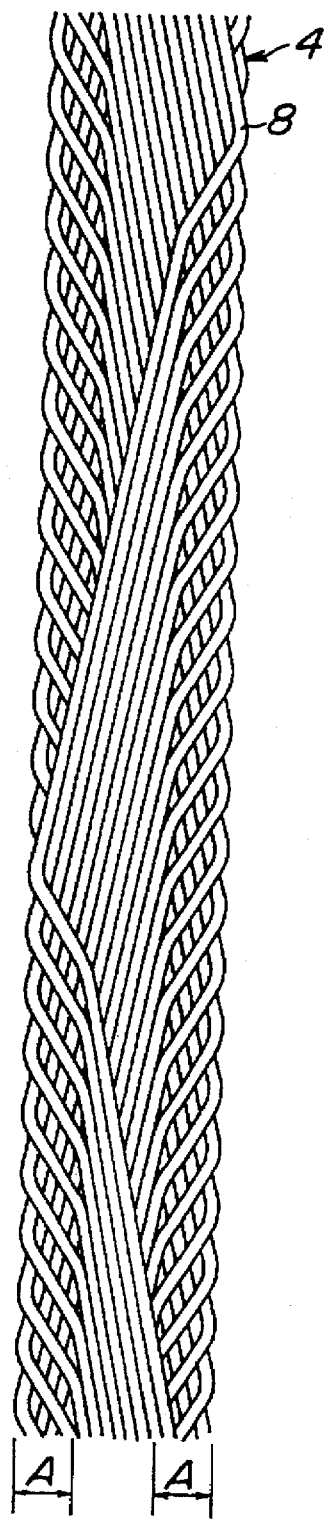
Figure 9:
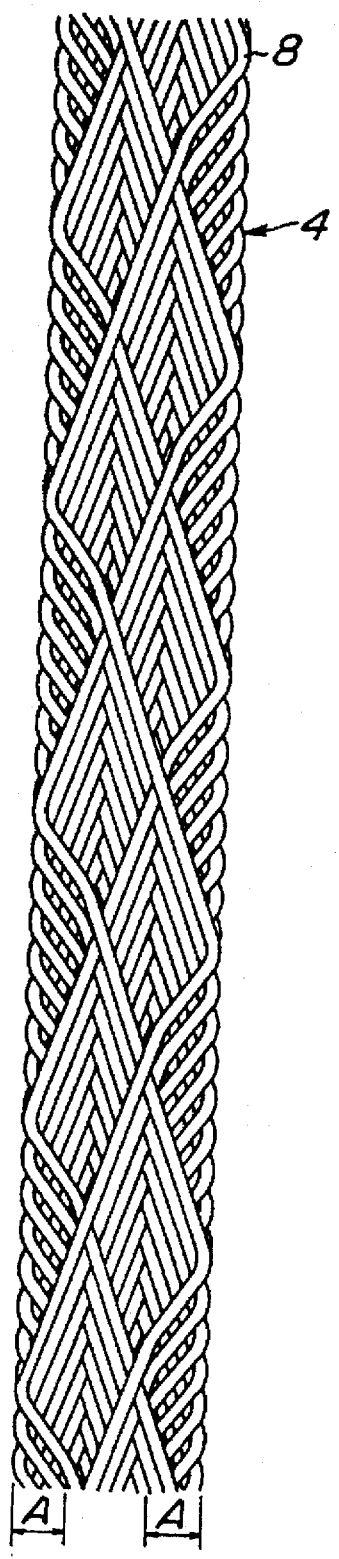
Figure 14:
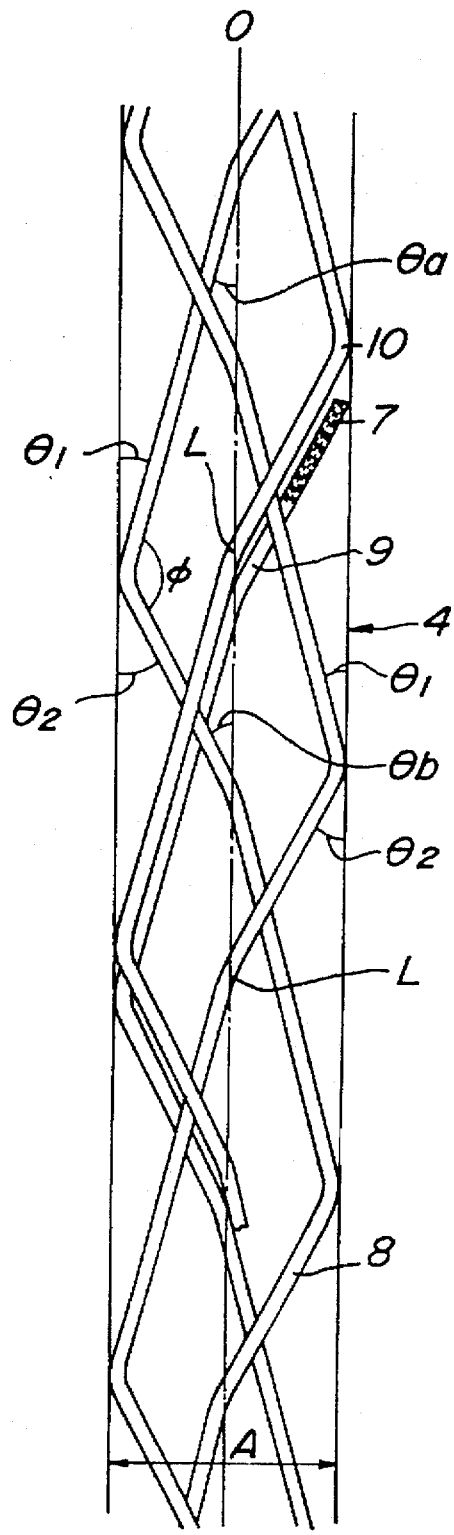
Figure 15:
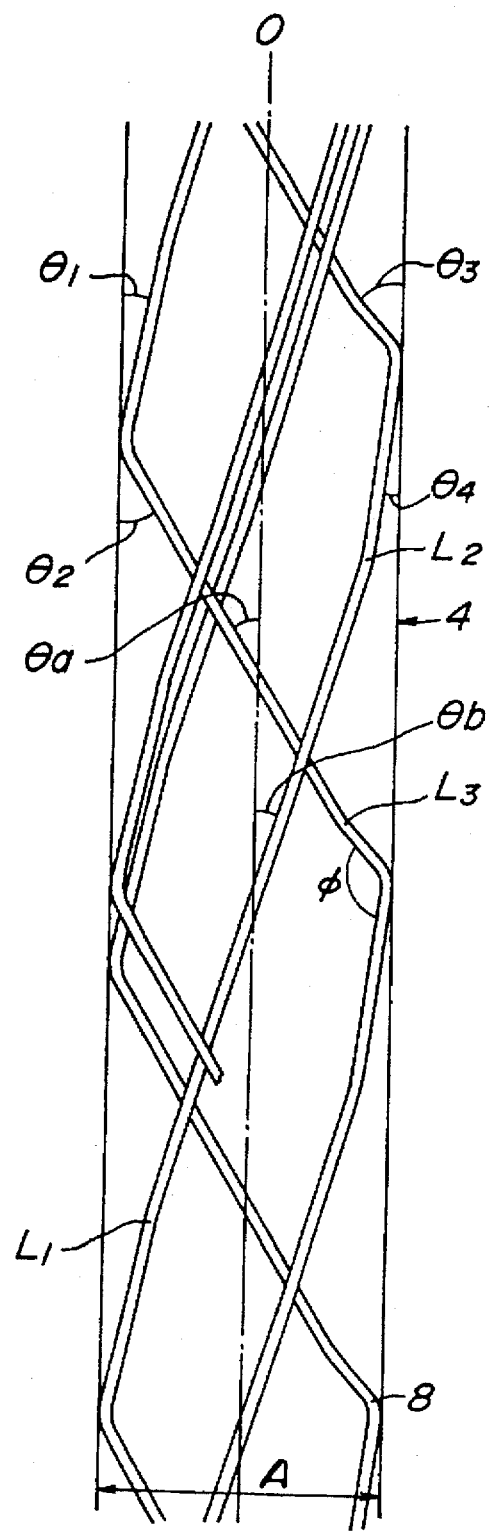
Figure 16:
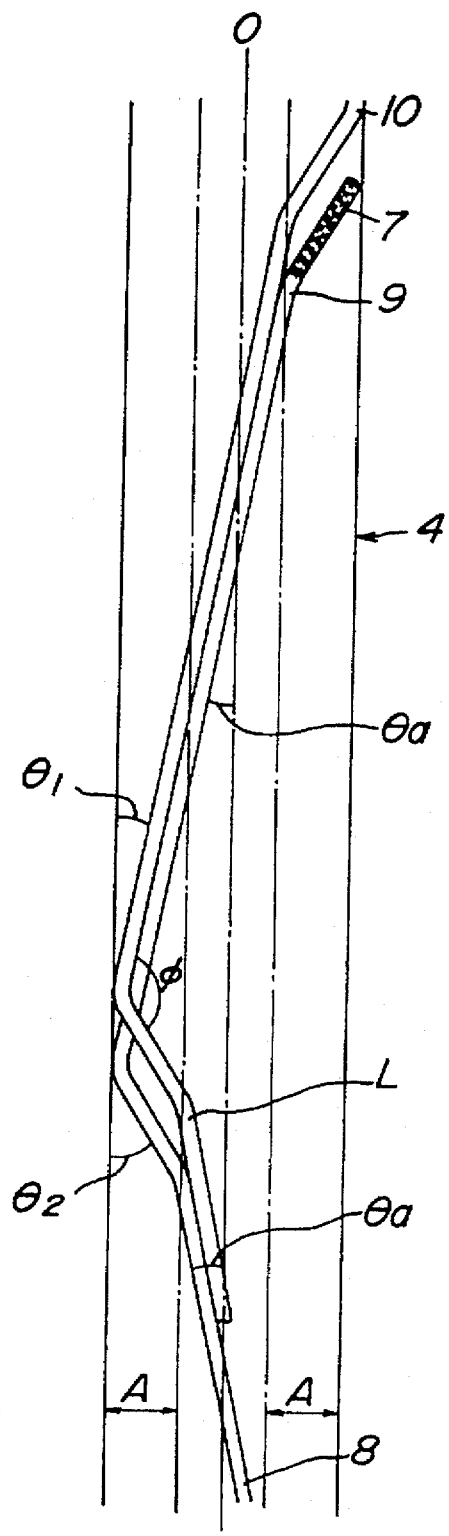
Figure 17:
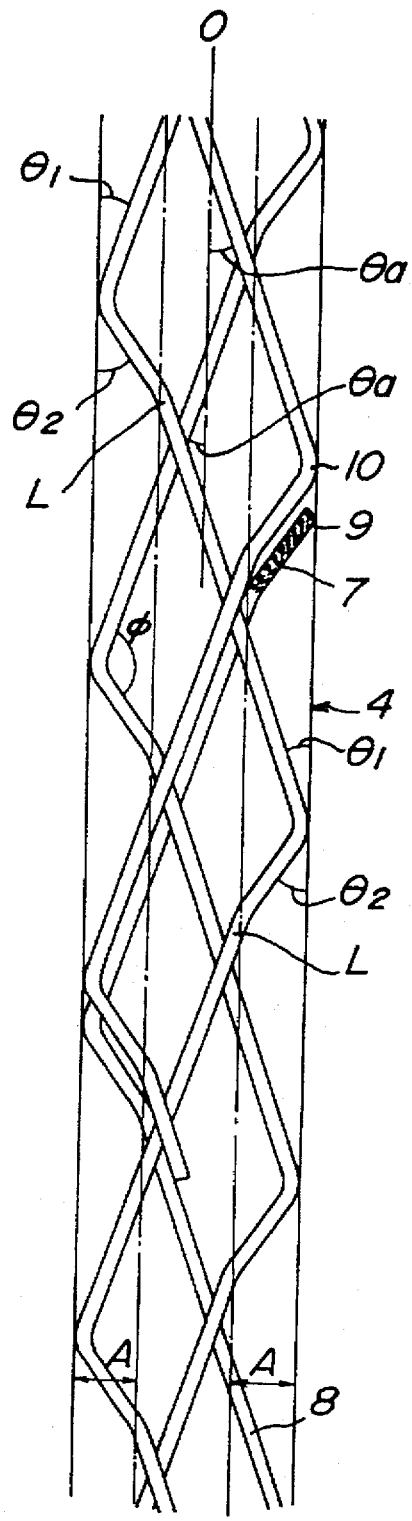
Figure 18:
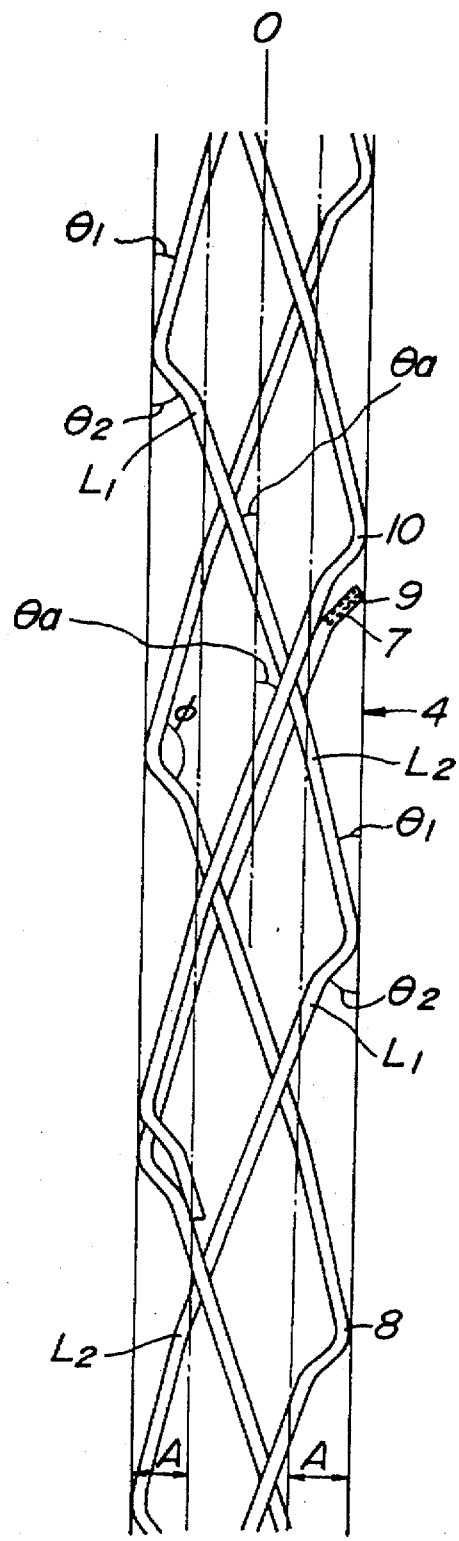
Figure 19:
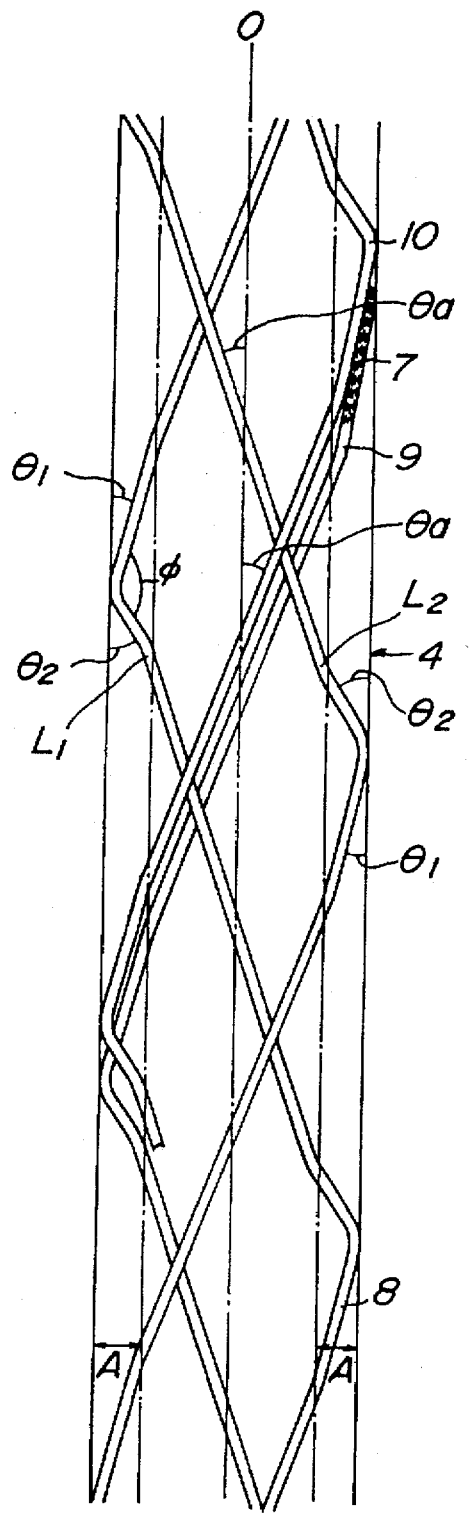

In the belts illustrated in FIGS. 6 and 7, the strip 8 is extended through at least one bent portion from one side edge of the belt toward the other side edge or from the other side edge toward the one side edge during belt formation as shown in FIGS. 14 and 15.

In the belt of FIG. 6, the strip 8 extends through a bent portion L located on the equatorial plane O and is bent at one side edge from the inclination angle $\theta_1$ to the inclination angle $\theta_2$ and then extended through a bent portion L located on the equatorial plane O and introduced into the other side edge of the belt at the inclination angle 61. Consequently, the unsymmetrical zone A is formed over the full width of the belt.

In the belt of FIG. 7, the strip 8 is extended through bent portions $L_1$ and $L_2$ having different bending angles from the one side edge of the belt toward the other side edge and through a bent portion $L_3$ from the other side edge toward the one side edge. The inclination angle of the strip 8 with respect to the equatorial plane O is varied so that the strip 8 is bent with the inclination angles $\theta_1$ and $\theta_2$ at the one side edge and with the inclination angles $\theta_3$ and $\theta_4$. Thus, the unsymmetrical zone A is formed over the full width of the belt.

In the belts shown in FIGS. 8–11, when the strip 8 is extended through one bent portion L (FIGS. 16 and 17) or two bent portions $L_1$ and $L_2$ (FIGS. 18 and 19) from one side edge of the belt toward the other side edge thereof during the belt formation as shown in FIGS. 16–19, an intersection angle of the strip 8 with the equatorial plane O in a central region of the belt is the same in the extending direction from the one side edge toward the other side edge and in the extending direction from the other side edge toward the one side edge. Consequently, the unsymmetrical zone A is formed only in each of the belt side regions. When the unsymmetrical zone A is formed only in the belt side region as mentioned above, it is favorable that the unsymmetrical zones A are symmetrical with respect to the equatorial plane O.

Moreover, in order to efficiently ensure stretching in the circumferential direction at the belt side region for absorbing the radial difference between the central portion and the side end of the tread, it is preferable that if the intersection angles of the strip with the equatorial plane O in the central region of the belt are same $\theta_a$, the bending angle $\phi$ at the side edge of the belt and the intersection angle $\theta_a$ satisfy $90° - \phi/2 \geq \theta_a + 2°$. On the other hand, if the intersection angles are different $\theta_a$ and $\theta_b$, it is favorable to satisfy the following equation:

$$90 = (\theta_i + \theta_{i+1})/2 \geq (\theta_a + \theta_b)/2 + 2°$$

wherein $\theta_i$ and $\theta_{i+1}$ are inclination angles of the strip at the side edge of the belt.

The bending angle $\phi$ of the strip 8 at the side edge of the belt is preferably set to a range of 110°–150° from a viewpoint of cord durability or tire performances. As a result, a sum of inclination angles $\theta_1$ and $\theta_2$ or $\theta_3$ and $\theta_4$ of the strip 8 at each side edge is within a range of 180°–(110°–150°)=30°–70°.

In order to control shoulder wear, as shown in FIG. 1, it is favorable to make a gauge $d_2$ between the belt and the carcass in the vicinity of the belt side edge thicker than a gauge $d_1$ between the belt and the carcass in the vicinity of the central region of the tread in the arrangement of the belt 4. When the belt reinforcing layer 5 having a cord inclination angle larger than the inclination angle of the strip in the belt 4 with respect to the equatorial plane O is combined with the belt 4, it is favorable that the belt reinforcing layer 5 is not disposed on the unsymmetrical zone A formed in the belt side region for controlling shoulder wear.

Moreover, the tires shown in FIGS. 1 and 2 are heavy duty pneumatic radial tires comprising a combination of the belt 4 and the belt reinforcing layer 5. The tire of FIG. 3 may be a pneumatic radial tire for passenger car use employing the belt 4 alone without the belt reinforcing layer.

In the formation of the belt, as shown in FIGS. 12–19, the rubberized strip 8 containing one or more cords 7 is bent M (integer) times at belt side edges through N (integer) times of tire rotation, whereby the strip 8 moves from a starting point 9 to a point 10 adjacent to the point 9. In this case, the peripheral pitch for shifting the strip 8 forward or backward is determined to render a distance between the preceding wound strip 8 and the succeeding wound strip 8 into a given length. Thus, it is possible to substantially arrange the strip at a desired inclination angle without causing a gap between adjoining strips to form belts shown in FIGS. 4–11.

In a pneumatic radial tire, the belt is expected to develop (1) a role of maintaining the shape of the carcass to bear tension under inflation of internal pressure or so-called hoop effect, (2) a role of controlling the movement of the tread at the ground contact region to suppress the occurrence of wear, and (3) a role as a protection layer of preventing the growth of cut damage into the inside of the tire. As the belt for the pneumatic radial tire, there has widely been used a belt formed by laminating rubberized cut plies containing plural cords therein to cross the cords of upper and lower plies with each other (hereinafter referred to as conventional belt). In this conventional belt, cut faces of the cords exist at each side end of the ply, so that interlaminar shearing strain is caused in the cut face to rapidly lower belt tension at the belt side edge and hence sufficient hoop effect may not be obtained.

On the contrary, the belt formed by extending the cord zigzag in the circumferential direction through bending at the belt side edge (hereinafter referred to as zigzag cord belt) develops a higher hoop effect compared with the conventional belt because there is no cord shifting between upper and lower layers at the belt side edge. Hence, the belt tension is not lowered at the side edge.

On the other hand, shoulder wear is largely dependent upon belt rigidity and crown shape.

As to crown shape, it is effective to control shoulder wear as the difference in outer diameter between the central portion of the tread and the shoulder portion becomes small. As the radius of curvature in the surface profile of the tread becomes large, the ground contact pressure at the shoulder portion rises to increase the quantity of heat build-up, which is apt to cause a separation failure at belt side edge as previously mentioned.

In the conventional belt, it is possible to absorb the difference of outer diameter by making the crossing angle between the cords large or lowering the rigidity of the belt. In the case of a zigzag cord belt, since the stretching in the circumferential direction at the belt side edge can not be expected, it is considered to arrange the belt side edge in a region having a small radial difference to the central portion of the tread or to narrow the width of the belt for making the radial difference resulted in the shoulder wear small. In the latter case, the difference of the rigidity is caused between the region of the belt arranged and the region located outside thereof and hence the action of the belt suppressing movement of the tread is not developed in the region located outside the side edge of the belt. As a result, the movement of the tread in the ground contact region rather increases to again bring about the shoulder wear.

The inventor has made various studies with respect to the structure of the zigzag cord belt and found that the above problems can be solved by specifying the arrangement of the strip constituting the belt.

That is, an unsymmetrical zone of crossing the strips between upper and lower layers in an unsymmetrical and opposite direction with respect to the equatorial plane of the tire is formed in at least each side region of the belt.

In the conventional belt, rubberized plies each containing plural cords are piled one upon the other to cross the cords of these plies to each other. An anisotropy is developed as a mechanical property and hence the rigidity differs in accordance with the stretching direction. The direction indicating the maximum rigidity is called an elastic main axis direction. Since the hoop effect is expected as an action of the belt, it is common to match the elastic main axis direction with the circumferential direction of the tire in the conventional belt. In the unsymmetrical zone of the zigzag cord belt according to the invention, the elastic main axis direction is inclined with respect to the equatorial plane of the tire. Thus, when the side region of the belt is stretched under loading, shearing deformation and shrinkage in the widthwise direction in the same plane of the belt become large, respectively, and hence the side edge of the belt is easily stretched in the circumferential direction to absorb the radial difference.

Moreover, the carcass disposed inside the zigzag cord belt according to the invention in the radial direction and further the belt reinforcing layer disposed outside the belt and containing cords arranged at a large cord inclination angle with respect to the equatorial plane restrain the shearing deformation and shrinkage in widthwise direction in the same plane of the belt according to the invention to obstruct the absorption of the radial difference. Therefore, it is preferable that the gauge between the belt and the carcass is thicker in the vicinity of the side edge of the belt than in the central portion of the tread. When being combined with the belt reinforcing layer having a large cord inclination angle with respect to the equatorial plane, the unsymmetrical zone is not arranged in the vicinity of the side edge of the belt. In the embodiments of FIGS. 1 and 3, the gauge between the belt and the carcass is made large in the side edge of the belt. In the embodiment of FIG. 2, the belt reinforcing layer having a large cord inclination angle with respect to the equatorial plane is used, but is not arranged in the vicinity of the side edge of the belt.

When the bending angle of the strip 8 at the side edge of the belt is less than 110°, the strip is extremely bent at the side edge of the belt and hence there are newly caused problems such as cord fatigue, cord breaking-up. When it exceeds 150°, the cord fatigue and cord breaking-up are not caused, but the in-plane shearing rigidity of the belt ply is lowered to lower the cornering power.

Further, when the cords are unsymmetrically crossed on both sides of the equatorial plane in the belt, the elastic main axis is inclined with respect to the equatorial plane to cause in-plane shearing deformation in the belt and hence the lateral force may be created during the straight running of the tire to damage the straight running stability of the tire. In the zigzag cord belt according to the invention, the strip is extended from one side edge of the belt toward the other side edge thereof and bent at the other side edge and then extended from the other side edge toward the one side edge in the opposite direction with respect to the equatorial plane. This, procedure is repeated to continuously extend the strip zigzag in the circumferential direction, so that it is possible to arrange the strips symmetrically with respect to the equatorial plane in the central region of the belt. This occurs by controlling each of outward track extending from the one side edge of the belt toward the other side edge and inward track extending from the other side edge toward the one side edge to make the inclination angle of the outward track with respect to the equatorial plane equal to that of the inward track.

Thus, the elastic main axis can be inclined in opposite directions at one side region and the other side region of the belt sandwiching the central region of the belt by the above arrangement, whereby the lateral force created during straight running of the tire can be offset. Therefore, it is desirable that the unsymmetrical zone of the strip is arranged in both side regions other than the central region of the tire and is symmetrical with respect to the equatorial plane of the tire for controlling shoulder wear without damaging the straight running stability of the tire.

Moreover, if it is possible to control the shearing deformation and shrinkage in radial direction in the same plane of the belt by restraining with the carcass and the belt reinforcing layer in the central region of the tread to ensure the hoop effect of the belt and suppress the occurrence of lateral force during the straight running, a the belt having the unsymmetrical zone formed over the full width of the belt can be used.

The following examples are given in illustration of the invention and are not intended as limitations thereof.

A pneumatic radial tire having a tire size of 11/70 R22.5 and a five rib tread pattern shown in FIG. 1 is prepared according to a specification shown in Table 1.

For the comparison, there is provided a comparative tire having the same structure as in the above tire except that the strip is arranged to symmetrically cross on both sides of the equatorial plane over the full width of the belt as shown in FIG. 20.

Figure 21:
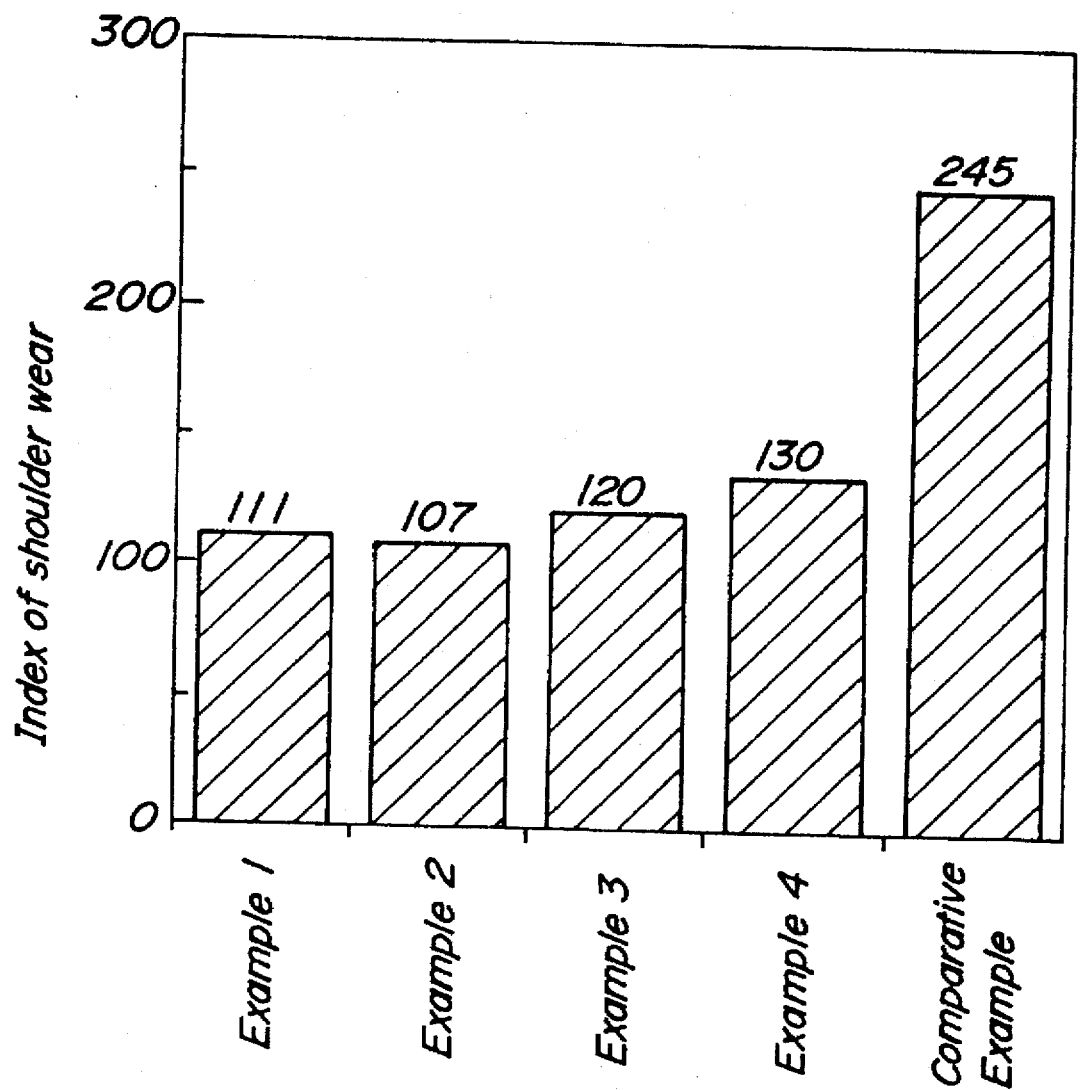
FIG. 21 is a graph showing a worn state of tread surface in each example.

In the tires of Examples 1–4, the belts shown in FIGS. 5, 6, 10 and 11 are formed by using cords of 3×0.23 mm+9× 0.23 mm and winding the strip containing these cords at M=5 and N=3 or a value of peripheral pitch f near to f=5/3 according to the belt formations shown in FIGS. 13, 14, 18 and 19, respectively. After the tire to be tested is mounted onto a rim having a size of 7.5×22.5 and inflated under an internal pressure of 7.5 kgf/cm², it is mounted onto a driven wheel shaft of so-called 2D-4 vehicle under a normal load and run on a paved road over a distance of 20,000 km to measure a worn state of a tread surface of the tire. The measured results are shown in FIG. 21 as an index of shoulder wear obtained by dividing an average value of maximum worn depths of ribs at both side ends of the tread by a maximum worn depth of a rib at the central region of the tread.

laminating to each other the rubberized strip upper and lower portions and crossing the cords of the upper and lower portions.

3. A pneumatic radial tire according to claim 1, wherein the inclination angle of the rubberized strip with respect to the equatorial plane is 5°–45°.

4. A pneumatic radial tire according to claim 1, wherein the part of the strip extending from one side edge of the belt to the other side edge thereof has at least one bent portion.

* * * * *

TABLE 1

Figure 10:
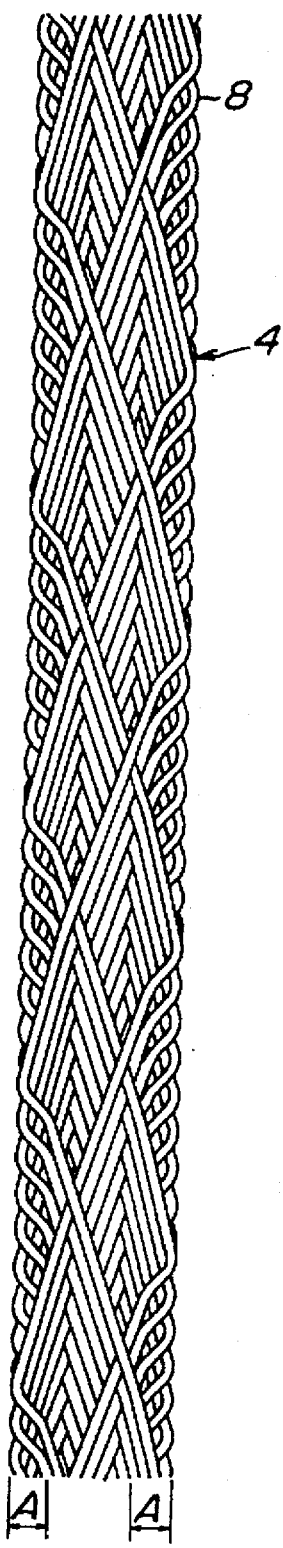
Figure 11:
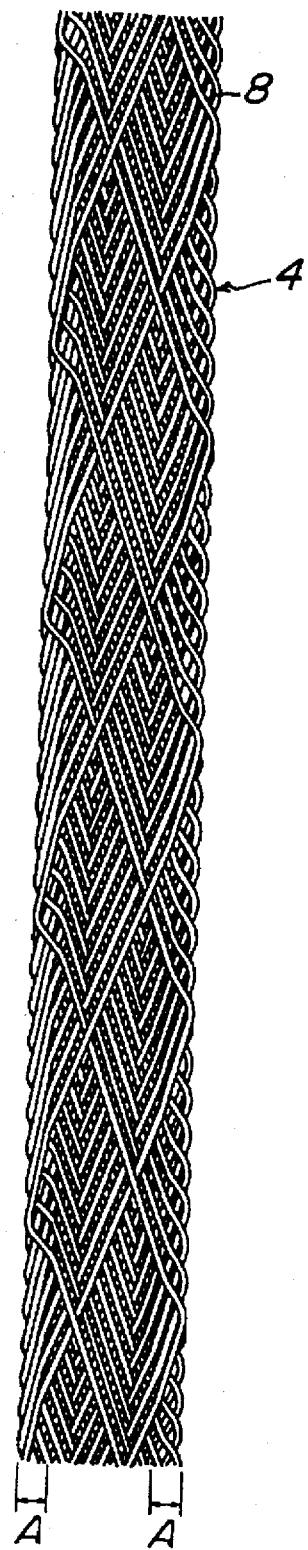

|  |  | Example 1 | Example 2 | Example 3 | Example 4 | Comparative Example |
|---|---|---|---|---|---|---|
| Belt ply | Belt structure applied | FIG. 5 (FIG. 13) | FIG. 6 (FIG. 4) | FIG. 10 (FIG. 18) | FIG.11 (FIG. 19) | FIG. 20 |
|  | cord | 3 × 0.23 + 9 × 0.23 | 3 × 0.23 + 9 × 0.23 | 3 × 0.23 + 9 × 0.23 | 3 × 0.23 + 9 × 0.23 | 3 × 0.23 + 9 × 0.23 |
|  | belt width | 200 mm | 200 mm | 200 mm | 200 mm | 200 mm |
|  | end count of strip | 33.46 strips/50 mm | 33.46 strips/50 mm | 33.46 strips/50 mm | 33.46 strips/50 mm | 33.46 strips/50 mm |
|  | peripheral pitch | 5/3 | 5/3 | 5/3 | 5/3 | 5/3 |
|  | inclination angle $\theta_1$ | 16° | 16° | 16° | 15° | 20° |
|  | inclination angle $\theta_2$ | 26° | 26° | 26° | 25° | 20° |
|  | inclination angle $\theta_3$ | — | — | — | — | — |
|  | inclination angle $\theta_4$ | — | — | — | — | — |
|  | bent portion L | 170° | 170° | — | — | — |
|  | bent portion $L_1$ | — | — | 174° | 172° | — |
|  | bent portion $L_2$ | — | — | 176° | 172° | — |
|  | bending angle $\phi$ | 138° | 138° | 138° | 140° | 140° |
| Belt reinforcing layer | cord | 3 × 0.2 + 6 × 0.36 | 3 × 0.2 + 6 × 0.36 | 3 × 0.2 + 6 × 0.36 | 3 × 0.2 + 6 × 0.36 | 3 × 0.2 + 6 × 0.36 |
|  | width | 100 mm | 100 mm | 100 mm | 100 mm | 100 mm |
|  | end count | 27.56 | 27.56 | 27.56 | 27.56 | 27.56 |
|  | cord angle | 70° | 70° | 70° | 70° | 70° |

According to the invention, there can be provided pneumatic radial tires controlling the occurrence of shoulder wear with the avoidance of belt end separation and having an excellent durability.

What is claimed is:

1. A pneumatic radial tire comprising; a radial carcass toroidally extending between a pair of bead cores, a belt and a tread disposed radially outward of the carcass; the belt comprising an arrangement with a rubberized strip containing one or more cords extended from one of both side edges of the belt toward the other side edge of the belt inclined with respect to an equatorial plane of the tire and continuously extended in a substantially zigzag manner in a circumferential direction of the tread while bending at each side edge of the belt; and an inclination angle of the strip with respect to a line parallel to the equatorial plane at each of the side regions of the belt changes before and after the bending at the side edge and a bending angle of the strip at each side edge of the belt is in the range of 110°–150°.

2. A pneumatic radial tire according to claim 1, wherein the belt arrangement comprises two belt layers formed by